United States Patent [19]

Zison

[11] Patent Number: 4,725,202

[45] Date of Patent: Feb. 16, 1988

[54] GAS-OPERATED PUMP

[75] Inventor: Stanley W. Zison, Irvine, Calif.

[73] Assignee: Getty Synthetic Fuels, Inc., Signal Hill, Calif.

[21] Appl. No.: 410,552

[22] Filed: Aug. 23, 1982

[51] Int. Cl.$^4$ .............................................. F04F 1/00
[52] U.S. Cl. .................................... 417/138; 417/566; 137/851; 137/512.15
[58] Field of Search ............... 417/118, 138, 566, 121; 137/851, 512.1, 512.15

[56] References Cited

U.S. PATENT DOCUMENTS

| | | | |
|---|---|---|---|
| 555,096 | 2/1896 | Hooker | 417/566 X |
| 751,323 | 2/1904 | Moran et al. | 417/118 |
| 2,015,938 | 10/1935 | Humason . | |
| 2,257,523 | 9/1941 | Combs . | |
| 2,309,512 | 1/1943 | Kirkpatrick . | |
| 2,317,121 | 4/1943 | Thomas . | |
| 2,412,723 | 12/1946 | Elliott | 417/138 |
| 3,129,721 | 4/1964 | Nealley | 137/859 X |
| 3,537,472 | 11/1970 | Yulio . | |
| 3,592,560 | 7/1971 | Mitchell . | |
| 3,894,814 | 7/1975 | Morgan . | |
| 3,991,825 | 11/1976 | Morgan | 417/138 X |
| 4,021,147 | 5/1977 | Brekke . | |
| 4,181,470 | 1/1980 | Gillett . | |
| 4,352,377 | 10/1982 | Fritchman | 137/851 |

*Primary Examiner*—Carlton R. Croyle
*Assistant Examiner*—T. Olds
*Attorney, Agent, or Firm*—Gordon L. Peterson

[57] ABSTRACT

A pump comprising an elongated housing adapted to be positioned in a landfill gas well. The housing has a peripheral wall, an interior chamber and apertures in the peripheral wall leading from the exterior of the housing to the chamber so that liquid can flow from the well into the chamber. A pressure responsive valve member is mounted in the chamber on the peripheral wall and extends across the apertures. A discharge conduit extends from the chamber to a location above the housing. When the liquid level in the chamber rises to a predetermined upper level, gas under pressure is supplied to the chamber. The gas under pressure causes the pressure responsive valve member to close the apertures and it forces the liquid out of the chamber through the discharge conduit.

5 Claims, 5 Drawing Figures

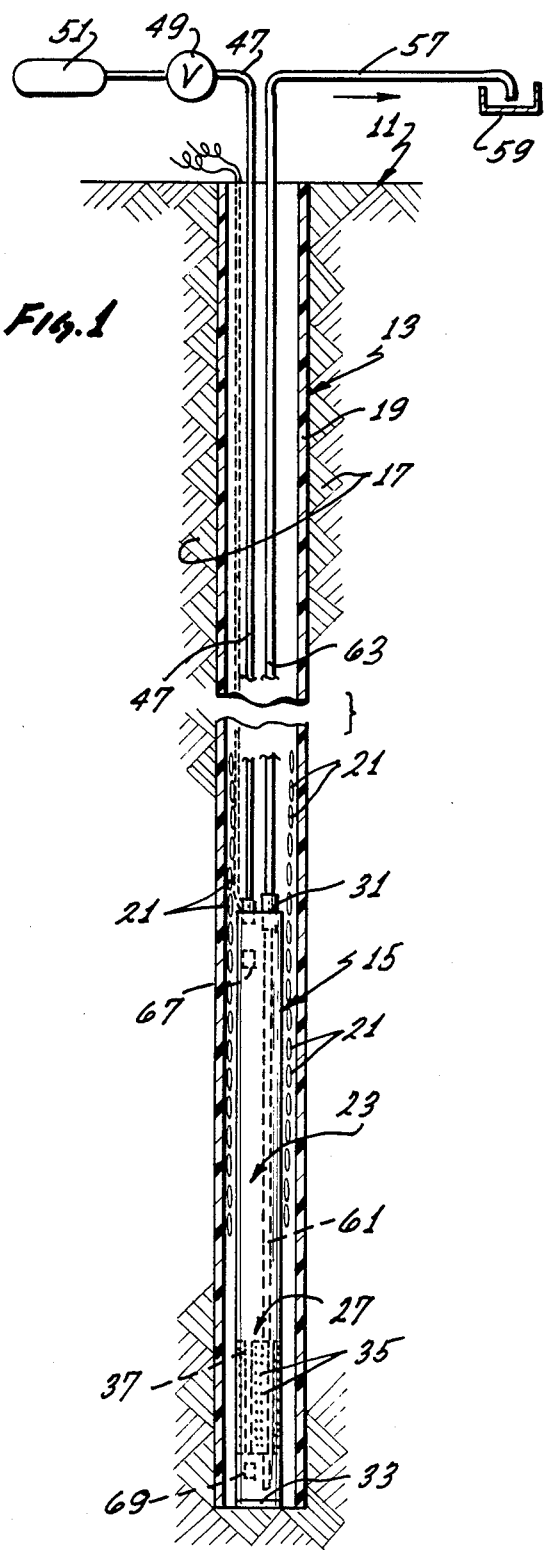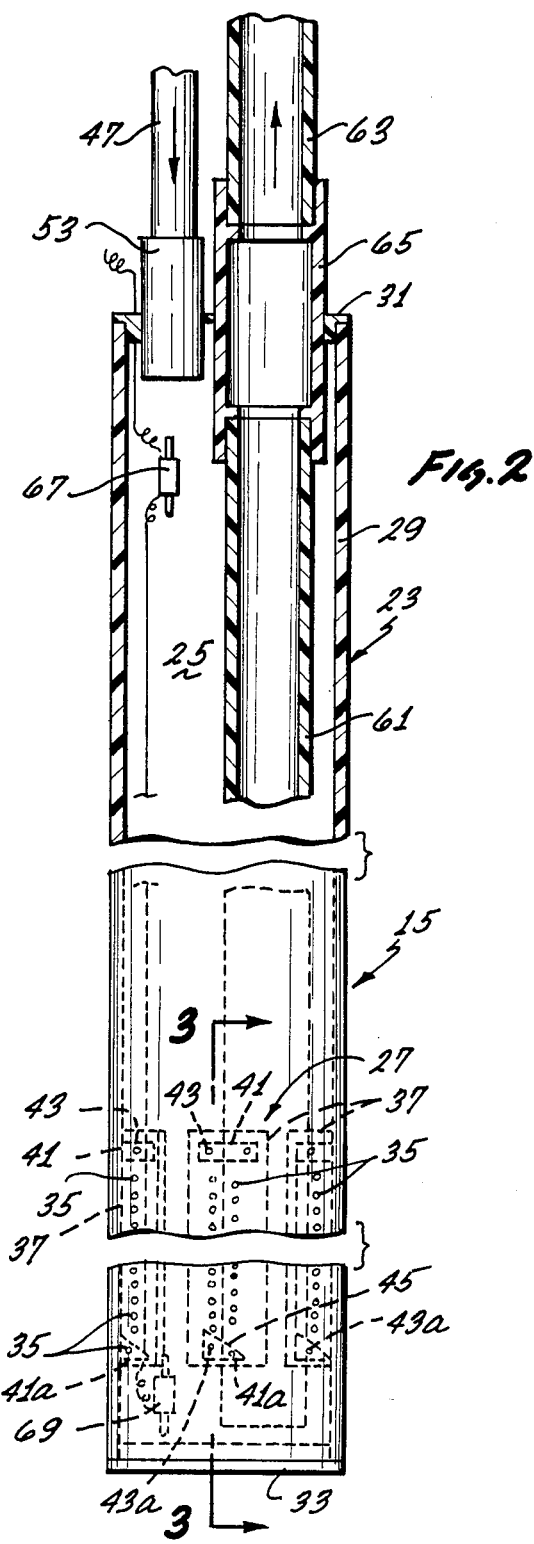

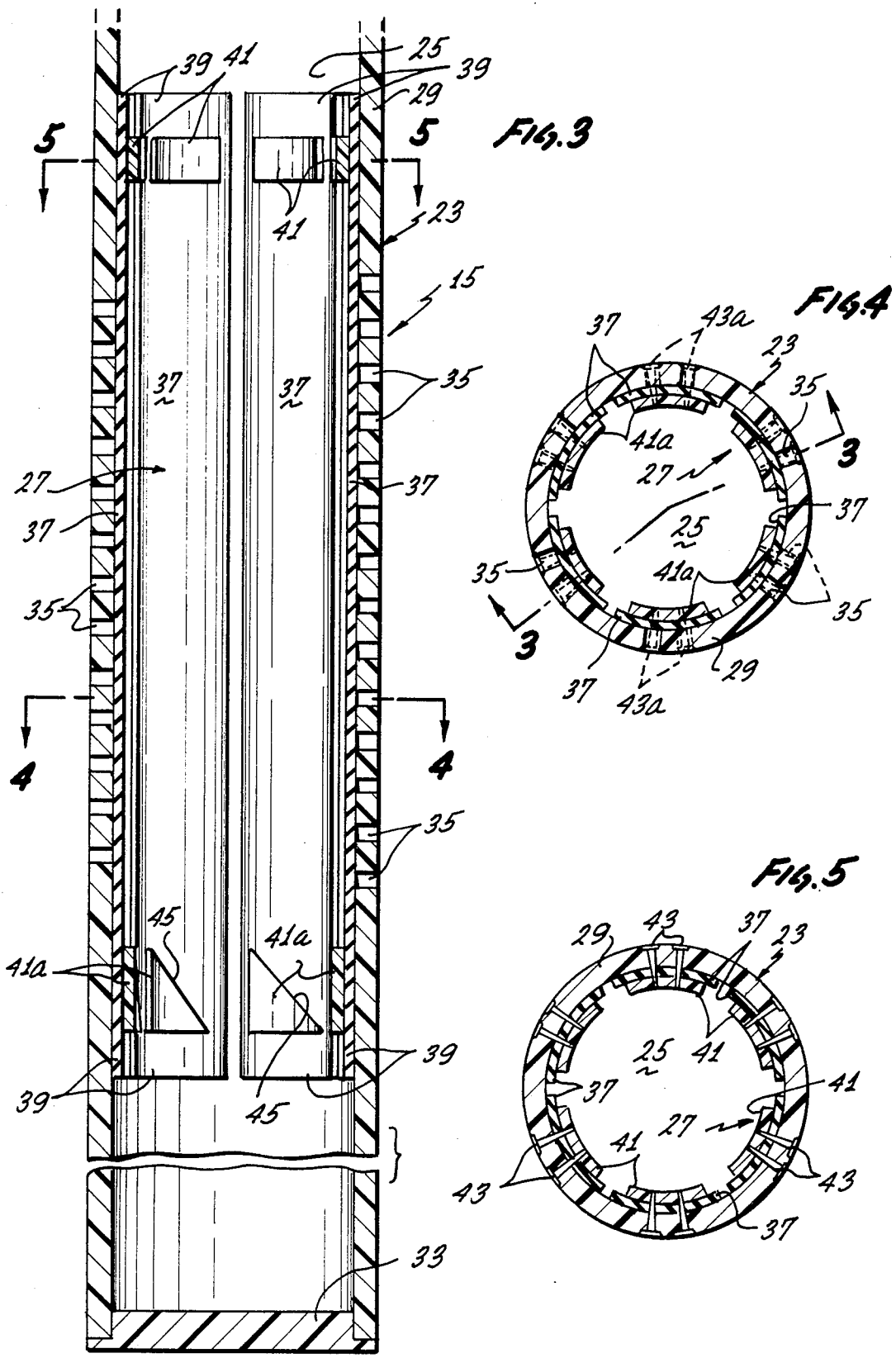

GAS-OPERATED PUMP

BACKGROUND OF THE INVENTION

The refuse in landfills decomposes to produce a landfill gas which may include, for example, about fifty percent methane. To recover the landfill gas, and hence the methane, wells are set in the landfill and are lined with a slotted casing. The landfill gas passes through the slots into the interior of the well and is extracted from the well for use.

One problem with landfill gas wells is that landfills typically contain an essentially liquid component or leachate which seeps into the well casing through the slots. As the leachate level rises in the well, it progressively closes off the slots, and so the landfill gas output from the well is correspondingly reduced.

SUMMARY OF THE INVENTION

This invention solves this problem by providing a pump which is particularly adapted for pumping leachate from landfill gas wells. Although the pump is particularly adapted for this purpose, it can be used to pump various other kinds of liquid-based flowable materials in various different environments. Liquid-based flowable material means essentially non-gaseous flowable material which may include a significant liquid or sludge component. Particulate solids may be included in the liquid-based flowable materials to various degrees.

The pump has a chamber into which the flowable material can flow. When the flowable material rises to a predetermined upper level, gas under pressure is supplied to the chamber to expel the flowable material from the chamber through a discharge conduit. This basic pumping principle is shown, for example, by Elliott U.S. Pat. No. 2,412,723, Brekke U.S. Pat. No. 4,021,147 and Gillett U.S. Pat. No. 4,181,470.

One feature of this invention is the manner in which the flow of flowable material into the interior chamber is controlled. To provide flow control, this invention provides a valve which comprises aperture means in the wall of the chamber through which the entering flowable material can pass and a pressure responsive valve member in the chamber which is movable in response to the differential pressure across such member to open and close the aperture means. The aperture means preferably includes a plurality of apertures which may collectively provide a relatively large cross-sectional opening. The pressure responsive valve member preferably includes a plurality of resilient closure members which extend across the apertures. Accordingly, when gas pressure is applied to the interior of the chamber, the closure members are forced tightly against their associated apertures to close them off thereby terminating the inflow of flowable material. This enables the gas under pressure to force the flowable material in the chamber out through the discharge conduit.

To adapt the pump for use in a well, the pump preferably includes an elongated housing which is adapted to be positioned in the well. The housing has a peripheral wall and the interior chamber is within the housing. Although the aperture means can be formed in various different locations, preferably the aperture means is in the peripheral wall. With this arrangement, any number and size of apertures which do not too greatly weaken the peripheral wall can be used.

The closure members extend over their associated apertures. Regions of the closure members on the opposite sides of the apertures are attached to the peripheral wall. Although the attachment means can take different forms, in a preferred construction, fastener means extends through the peripheral wall, the associated closure member and a tab so that the closure member is clamped between the housing and the tab. This simply and inexpensively mounts the closure member. The upper end of the tab can be inclined, if desired, to reduce any tendency to trap debris or other components of the liquid-like flowable material which might tend to collect.

The pump preferably includes upper level detection means for providing a signal when the flowable material in the chamber rises to about a predetermined upper level. Means, such as a solenoid valve, is responsive to the signal for supplying gas under pressure to the chamber. The discharge conduit preferably extends to a location closely adjacent the bottom of the chamber so that substantially all of the flowable material can be discharged during each cycle of operation. The flow of gas under pressure to the chamber can be terminated in various ways, such as in response to a signal from a low level detector or after a predetermined length of time.

The invention, together with additional features and advantages thereof, may best be understood by reference to the following description taken in connection with the accompanying illustrative drawings.

BRIEF DESCRIPTION OF THE DRAWINGS

FIG. 1 is a sectional view of a landfill gas well having a pump constructed in accordance with the teachings of this invention and installed therein.

FIG. 2 is a fragmentary side elevational view partially in section of the pump.

FIG. 3 is a fragmentary sectional view taken generally along line 3—3 of FIG. 4.

FIGS. 4 and 5 are sectional views taken generally along lines 4—4 and 5—5, respectively, of FIG. 3.

DESCRIPTION OF THE PREFERRED EMBODIMENT

FIG. 1 shows a landfill 11 having a landfill gas well 13 installed therein. A pump 15 constructed in accordance with the teachings of this invention is installed in the well 13. The landfill 11 comprises refuse 17 which decomposes to produce a landfill gas.

The well 13 comprises a tubular casing 19 having slots 21 for admitting landfill gas into the casing 19. The interior of the casing 19 may be maintained at a reduced pressure to induce the flow of landfill gas into the casing 19 in accordance with known techniques.

The landfill 11 contains leachate which flows through the slots 21 into the casing 19. The leachate, which may be considered as essentially in liquid form, progressively fills the casing and closes off the slots 21. To the extent that the slots 21 are closed off, landfill gas is blocked from flowing into the well, and landfill gas production from the well is, to that extent, reduced.

The pump 15 is provided to pump the leachate from the well 13. In the embodiment illustrated, the pump 15 lies below the uppermost slots 21 and rests on the bottom of the well, with its long axis generally vertical. The pump 15 includes an elongated housing 23 (FIG. 2), an interior chamber 25 and a valve 27 for controlling the flow of flowable material into the housing.

Although different constructions are possible, in the embodiment illustrated, the housing 23 includes a cylindrical, elongated tube or pipe 29, the opposite ends of which are closed by upper and lower plastic end walls 31 and 33, respectively, to form the chamber 25. The tube 29 provides a peripheral wall for the housing 23. Although the housing may be constructed of different materials, a plastic, such as chlorinated polyvinylchloride (CPVC), is preferred because of its chemically-resistant properties. The end walls 31 and 33 are partially received within the tube 29 as shown in FIGS. 2 and 3 and are suitably attached to the tube. The end walls do not extend radially beyond the periphery of the tube. Accordingly, the end walls do not radially enlarge the pump, and this is of some importance because the radial dimension of the casing 19 may not be large.

To permit the leachate to enter the housing 23, the valve 27 includes aperture means which, in the embodiment illustrated, is in the form of apertures 35 extending through the tube 29. Although the apertures 35 may be of different configurations and can be arranged in different patterns, in the embodiment illustrated, the apertures are arranged in circumferentially spaced pairs of axially extending rows. When arranged in this manner, the tube 29 is not excessively weakened and the valve performs well. The lowermost of the apertures 35 is near the lower end of the housing 23.

In order to control the entry of leachate into the chamber 25, the valve 27 includes a pressure-responsive valve member which, in the embodiment illustrated, includes closure members in the form of resilient strips 37. One of the strips 37 is provided for each of the pairs of rows of the apertures 35. Although this is merely illustrative, six of the strips 37 are provided. The strips 37 are mounted within the chamber 25 on the tube 29 and, like the rows of the apertures 35, extend axially of the tube 29. Each of the strips 37 extends longitudinally across its associated rows of apertures 35, and regions of the strips in the form of upper and lower end portions 39 lie on opposite sides of the associated rows of apertures 35. Although the strips 37 can be mounted on the tube 29 in different ways, in the embodiment illustrated, the upper end portions 39 are clamped between tabs 41, and the tube 29 with fasteners, such as stainless steel screws 43, extending through the tube and the associated end portions 39 and tabs 41 to clamp the end portions between the tabs and the tube.

The lower end portions 39 are mounted on the tube 29 in the same manner, and corresponding parts are designated by corresponding reference numerals followed by the letter "a." The screws 43 and 43a are identical, and the tabs 41 and 41a are identical, except that the latter have inclined upper surfaces 45 which are inclined as they extend circumferentially. The tabs 41a are preferably constructed of a chemically-resistant plastic material, such as CPVC.

The resilient strips 37 may be constructed of any suitable resilient material which is chemically-resistant in a landfill, such as silicone rubber. The resilient strips 37 allow leachate to flow through the apertures 35 into the chamber 25. However, the strips 37 are pressure responsive and can be urged radially outwardly to seal off the associated apertures 35 to substantially prevent the flow of leachate through the apertures out of the chamber 25.

To urge the resilient strips radially outwardly to close the valve 27, the pump 15 includes a gas conduit 47 and a valve 49 (FIG. 1). The gas conduit is coupled at one end to a source of pressurized gas 51, such as compressed air, and at the other end to the end wall 31 via a fitting 53 (FIG. 2) which extends a short distance through the end wall. The valve 49 can be opened to supply compressed air through the gas conduit 47 to the chamber 25 to force the resilient strips 37 into sealing engagement with their respective apertures 35 to close the valve 27 and to pressurize the leachate within the chamber 25.

To permit discharge of the leachate from the chamber 25 when the compressed air is supplied to the chamber, a discharge conduit 57 (FIGS. 1 and 2) is provided. The discharge conduit 57 extends from a location closely adjacent the bottom end wall 33 to a suitable leachate receptacle 59 outside the well 13. By extending the lower end of the discharge conduit 57 into close proximity to the lower end wall 33, removal of substantially all of the leachate during each cycle of operation is made possible. Although different constructions are possible, in the embodiment illustrated, the discharge conduit 57 includes an interior section 61 and an exterior section 63 joined to the interior section by a suitable coupling 65 which is mounted on and extends through the upper end wall 31.

The valve 49 can be controlled in different ways. For example, the valve 49 can be opened by an upper level detector 67 (FIG. 2) and closed by a lower level detector 69. In the embodiment illustrated, the level detectors 67 and 69 are each in the form of a thermal conducting liquid level detector. The upper level detector 67 is suitably mounted on the tube 29 just below the fitting 53 and it provides a signal to the valve 49 when the leachate level in the chamber 25 rises to the level of the detector 67. The valve 49 responds to this signal and opens to supply compressed gas under pressure to the chamber 25. Conversely, when the leachate level drops below the lower level detector 69, a signal is provided to close the valve 49 to terminate the flow of compressed air into the chamber 25. The lower level detector 69 is mounted in any suitable way on the tube 29 and provides the valve closure signal to the valve 49 when the leachate level is slightly above the lower end of the discharge conduit 57.

In use, the pump 15 cycles on and off. During the off portion of the cycle, the valve 27 is open to allow the chamber 25 to fill, and during the on portion of the cycle, the valve 27 is closed by the air under pressure. Also, the leachate is forced by the compressed air pressure from the chamber 25 through the discharge conduit 57 to the receptacle 59 during the on portion of the cycle. The valve 27 operates automatically in response to differential pressure and is corrosion resistant. It consists of a minimum of parts and is unlikely to totally clog because of the large number of the apertures 35. The inclined upper surfaces 45 reduce the tendency of sludge or solids to build up on the tabs 41a.

Although an exemplary embodiment of the invention has been shown and described, many changes, modifications and substitutions may be made by one having ordinary skill in the art without necessarily departing from the spirit and scope of this invention.

I claim:

1. A pump for use in a well having liquid-based flowable material which is to be removed from the well, said pump comprising:

an elongated housing adapted to be positioned in the well, said housing having a peripheral wall, an interior chamber and at least one aperture in the peripheral wall leading from the exterior of the housing to the chamber whereby the flowable material from the wall can pass through the aperture in the peripheral wall and enter the chamber;

a pressure responsive valve member in said chamber, said pressure responsive valve member including at least one resilient closure member;

means for mounting said pressure responsive valve member on said peripheral wall so that said resilient closure member extends over said aperture and is attached to said housing on the opposite sides of the aperture, said resilient closure member being movable in response to differential pressure across such closure member to open and close the aperture;

a discharge conduit extending from the chamber to a location above the chamber to which it is desired to conduct the flowable material;

means for supplying gas under pressure to the chamber, the gas under pressure urging the resilient closure member to close said aperture and to force the liquid out of the chamber through the discharge conduit;

wherein there are a plurality of apertures in the peripheral wall and the valve member includes a plurality of resilient closure members extending generally axially in the chamber with each of the closure member overlying at least one of the apertures, each of said closure members being elongated;

said mounting means for the valve member including means for attaching regions of each of the closure members on opposite sides of the associated aperture to the housing; and said last-mentioned means for attaching includes a tab, and fastener means extending through said peripheral wall, at least one of said closure members, and said tab whereby a region of said one closure member is clamped between the tab and the housing, said tab having an upper surface which is inclined.

2. A pump as defined in claim 1 wherein the resilient closure member is constructed of silicone rubber.

3. A pump as defined in claim 1 including means for terminating the supply of gas under pressure to the chamber after a predetermined length of time.

4. A pump as defined in claim 1 wherein said peripheral wall includes a generally cylindrical elongated tube, said housing including an end wall closing the lower end of said tube, and said discharge conduit extends from a location adjacent the end wall through the housing and out the end of the housing opposite said end wall.

5. A pump as defined in claim 4 wherein said tube is constructed of plastic and said end wall is at least partly received in said tube.

* * * * *